No. 640,280.  
J. H. DOERR.  
UMBRELLA HOLDER FOR VEHICLES.  
(Application filed Sept. 18, 1899.)  
Patented Jan. 2, 1900.

(No Model.)

WITNESSES.  
Henry Hofmann.  
John Hagmann.

INVENTOR.  
J. Henry Doerr

UNITED STATES PATENT OFFICE.

JOHN HENRY DOERR, OF LOUISVILLE, KENTUCKY.

UMBRELLA-HOLDER FOR VEHICLES.

SPECIFICATION forming part of Letters Patent No. 640,280, dated January 2, 1900.

Application filed September 18, 1899. Serial No. 730,937. (No model.)

*To all whom it may concern:*

Be it known that I, JOHN HENRY DOERR, a citizen of the United States, residing at Louisville, county of Jefferson, and State of Kentucky, have invented a new and useful Umbrella-Holder for Vehicles, of which the following is a specification.

The object of my invention is to furnish a holder for carrying umbrellas on carriages or other vehicles in such a manner that the umbrellas may be accessible from either side of the vehicle when wanted, thus dispensing with the necessity of carrying wet umbrellas in the same compartment with the passengers and at the same time supplying a receptacle furnished with perforations for drainage purposes, in which umbrellas, walking-sticks, golf-sticks, and such articles may be carried. I attain these objects by means of a box made of metal, wood, leather, or other suitable material, with a door or lid at each end and so placed on the vehicle that one of these doors or lids shall be accessible from each side of the vehicle and the lower side or bottom of the box made with openings to allow any water draining from the articles to be discharged through the openings or carried away by means of a suitable drain-pipe. It is evident that such a box may be attached to any part of the vehicle desired, with its ends opening on either side of the vehicle.

I select to illustrate my invention the form in which the box is attached to the outside of the vehicle, directly under the rear of the coachman's seat, as shown in the accompanying drawings, in which—

Figure 1:
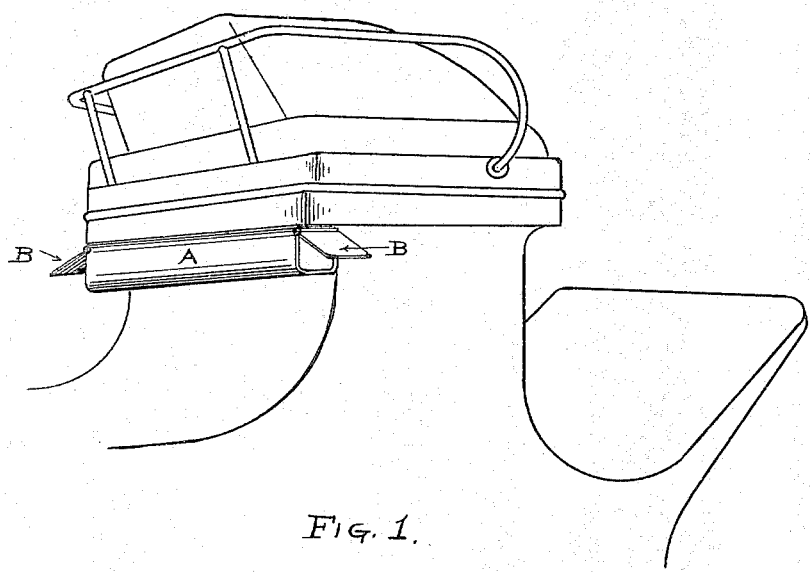
Figure 2:
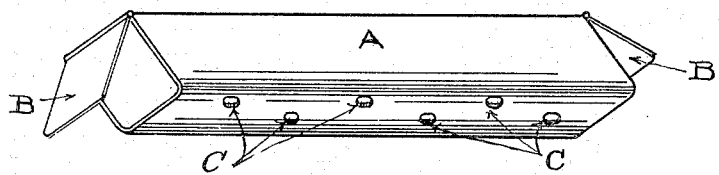

Figure 1 is a general view of my umbrella-holder attached to the under side of the coachman's seat. Fig. 2 is a view of the box detached.

Similar letters refer to similar parts in both views.

A is the box, which may be made of any suitable material, of such size and length as to hold as many umbrellas or other such articles as is desired.

B are the end doors or lids, hinged at the top or sides, one at each end, so that when the box is placed on the vehicle in the proper position one of these doors is accessible from either side of the vehicle. These doors may be made of any suitable material and may be made with a spring-hinge to keep them closed, or a suitable fastening may be provided for locking them when closed.

C are openings through the bottom of the box to allow any water draining from the umbrellas or other articles to escape from the box. It is evident that these openings may all be connected to a pipe to lead the drained water to any desired point.

I am aware that it is customary to furnish coaches and other vehicles with baskets and other receptacles for umbrellas and other articles; but these have hitherto been suspended in a vertical position and each one only conveniently accessible from the side of the vehicle to which it is attached and open only at one end, whereas my invention furnishes a single storage-receptacle equally convenient to use from either side of the vehicle.

What I claim as my invention, and desire to secure by Letters Patent, is—

An umbrella-holder to attach to vehicles, comprising the following features: a box or receptacle of suitable material, shape, and dimensions for holding one or more umbrellas, with an opening at each end supplied with a lid or other suitable covering, and containing small openings in the bottom for draining water therefrom to be so attached to the vehicle that one of the end openings is on, and accessible from, either side of the vehicle.

In testimony whereof I have signed my name to this specification in the presence of two subscribing witnesses.

J. HENRY DOERR.

Witnesses:
ED. MEGLEMRY,
JOSEPH SHORT.